United States Patent [19]

Ekstrand

[11] Patent Number: 4,743,765

[45] Date of Patent: May 10, 1988

[54] ARRANGEMENT OF A SIGHTING MARK AND A LIGHT-PRODUCING SOURCE OF ENERGY THEREFOR

[75] Inventor: John A. I. Ekstrand, Löberöd, Sweden

[73] Assignee: Interaims Aktiebolag, Malmo, Sweden

[21] Appl. No.: 72,156

[22] Filed: Jul. 10, 1987

Related U.S. Application Data

[63] Continuation of Ser. No. 777,196, Sep. 18, 1985, abandoned.

[30] Foreign Application Priority Data

Sep. 19, 1984 [SE] Sweden ............................ 8404685

[51] Int. Cl.$^4$ .............................................. F21K 2/00
[52] U.S. Cl. ................................................... 250/467.1
[58] Field of Search ................ 250/467.1, 458.1, 461.1

[56] References Cited

U.S. PATENT DOCUMENTS

| | | | |
|---|---|---|---|
| 1,529,643 | 3/1915 | Fenderl | 250/467.1 |
| 2,162,723 | 6/1939 | Karnes | 33/52 |
| 2,270,707 | 1/1942 | Karnes | 250/467.1 |
| 2,476,390 | 7/1949 | Wallhousen | 250/467.1 |
| 2,490,091 | 12/1949 | Reardon | 250/467.1 |
| 3,005,102 | 10/1961 | MacHutchim et al. | 250/467.1 |
| 3,478,209 | 11/1969 | Feuer | 250/467.1 |
| 3,784,817 | 1/1974 | James | 250/467.1 |
| 3,942,901 | 3/1976 | Ekstrand | 356/251 |

FOREIGN PATENT DOCUMENTS 371491 9/1974 Sweden .

Primary Examiner—Bruce C. Anderson
Attorney, Agent, or Firm—Shapiro and Shapiro

[57] ABSTRACT

The invention relates to an arrangement of a sighting mark and a light-producing source of energy therefor in an optical sighting instrument, especially a telescopic sighting tube. The invention is characterized in that at least one light-emitting capsule, preferably at least one $\beta$-ray transmissive capsule enclosing a $\beta$-ray producing substance, is mounted in the telescopic sighting tube at a point on a circle which is centered on the longitudinal axis of the sighting instrument and disposed at an axial distance of between about 0 and 2 r counted from a plane perpendicular to the axis and passing through the center of the sighting mark, the distance to the center not exceeding 2 r, where r is the radius from the center to the periphery of the light opening in the sighting tube at the level of the plane. The capsule, whether it is mounted spaced from or in the plane, is positioned and directed to send at least a substantial proportion of the radiation from the capsule onto the sighting mark to make the latter luminous.

5 Claims, 3 Drawing Sheets

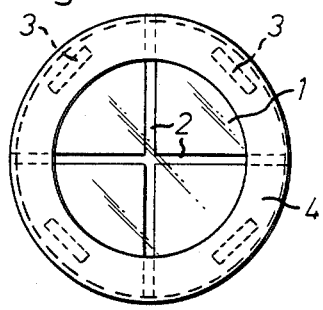
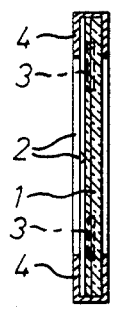
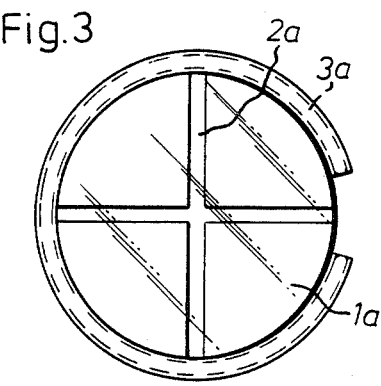
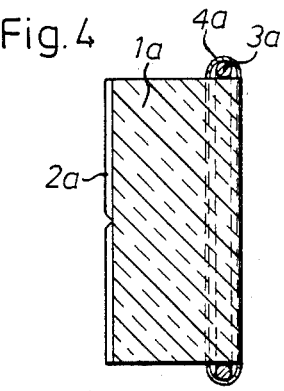
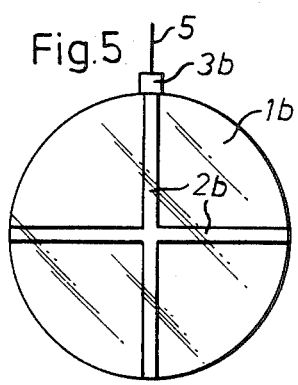
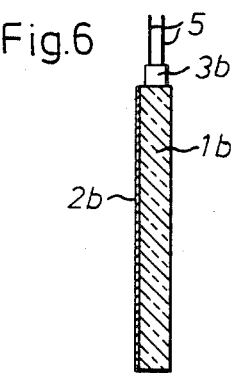

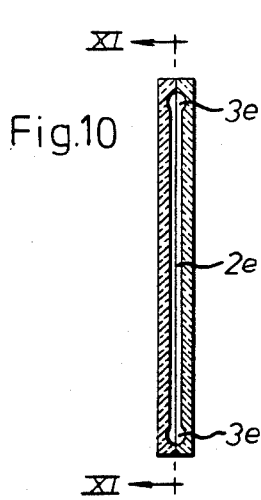
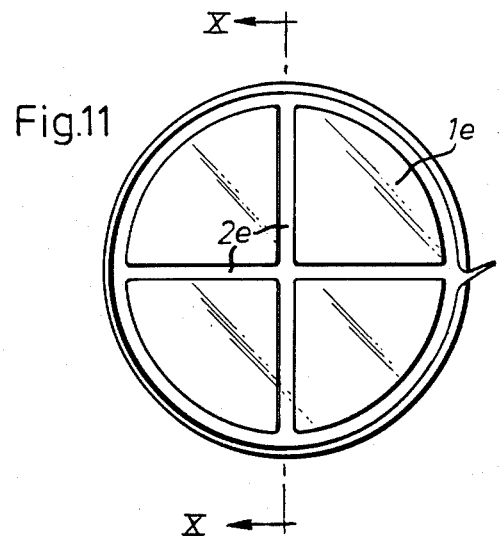
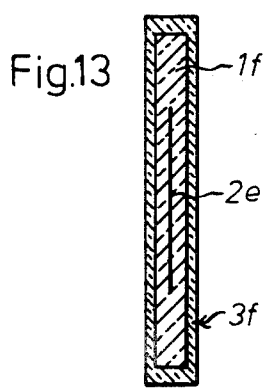
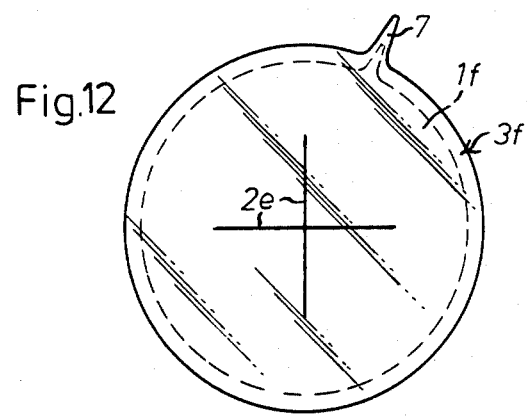
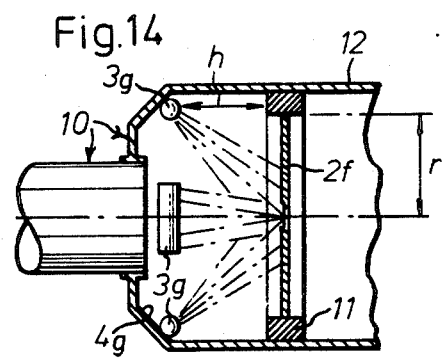

ARRANGEMENT OF A SIGHTING MARK AND A LIGHT-PRODUCING SOURCE OF ENERGY THEREFOR

This is a continuation application of Ser. No. 777,196 filed Sept. 18, 1985, now abandoned.

The present invention relates to an arrangement of a sighting mark, such as cross hairs or the like, and a light-producing source of energy to make the sighting mark luminous.

In conventional optical sighting instruments of the telescopic sighting tube type, the sighting mark usually is in the form of so-called cross hairs. It is, however, difficult to distinguish the thin lines forming the cross hairs against the background during and after twilight, and therefore such sighting marks are no help at all for night shooting.

In contrast to conventional telescopic sights, so-called luminous spot sights are provided with an arrangement for generating a luminous spot, i.e. a luminous sighting mark, and this known arrangement usually comprises a small electric battery, a light-emitting diode, and a translucent spherical mirror. If the mirror lies in the marksman's field of vision, which it usually does, the light intensity of the luminous spot sight, i.e. the admission of light through the sight from the target to the marksman's eye, is deteriorated to some extent. Using this known arrangement of luminous spot sights in connection with telescopic sights is difficult. So far, the arrangement has not been successfully applied to telescopic sights, in spite of the fact that the cross hairs of telescopic sights—however great the light-transmitting capacity of these sights may be—frequently cannot be perceived by the marksman under certain light conditions, such as darkness and dusk, although the actual target area may be well visible.

It is the object of this invention to overcome the above-mentioned problems by providing, for use in connection with sighting instruments of different types and especially for telescopic sighting tubes, an arrangement that enables the marksman, with a minimum of trouble, to perceive the sighting mark even in complete darkness.

To this end, the invention provides an arrangement of a sighting mark and a light-producing source of energy therefor in a sighting instrument, especially a telescopic sighting tube, in order to make the sighting mark luminous. The arrangement is characterized in that at least one light-producing source of energy, especially a $\beta$-ray transmissive capsule enclosing a $\beta$-ray producing substance, is mounted in the telescopic sighting tube at a point on a circle centered on the longitudinal axis of the sighting instrument and disposed at an axial distance of between about 0 and 2 r from a plane perpendicular to said axis and passing through the center of the sighting mark, where r is the radius from the center to the periphery of the light opening in the sighting tube at the level of said plane, and in that means are provided to direct radiation from said capsule to the sighting mark.

In a preferred embodiment according to the invention, use is made of $\beta$-ray producing capsules disposed at a distance not exceeding 1 r from the plane of the sighting mark and most preferably 0 r, which means that each capsule is incorporated in the plane. In this case, the sighting mark is formed on or incorporated in a disc of optical material, and by mounting each capsule on the peripheral edge of the disc or incorporating the capsule in the material proper, the material will serve as a light transmitter leading directly to the sighting mark. Such an embodiment will eliminate all of the problems described above and, furthermore, will eliminate the need for disconnection of the source of energy when a sighting instrument equipped with the arrangement according to the invention is not being used. In this manner, the marksman avoids the problem of a complete discharge of a battery simply because he forgot to disconnect the battery after use of the sighting instrument.

However, the light-producing device may, of course, be a light-emitting diode and an electric miniature battery of the same type as is being used for luminous spot sights, but in this instance the present invention eliminates the use of a semispherical mirror for producing the sighting mark, and although the arrangement in this instance also may require a microswitch for disconnecting the battery, the power supply from the battery may lie at such a low value that a complete battery discharge will take so long that neglecting to disconnect the battery will make no difference, unless the discharge is allowed to continue over a period of months.

With the arrangement according to the invention, accurate sharpshooting can be carried out under all dusk and darkness conditions during which the target area is at all perceivable, and furthermore the arrangement according to the invention makes it possible to take aim in complete darkness at targets which are not visible but may be perceived in some other manner, for instance by hearing.

It should be mentioned in particular that the arrangement according to the invention is eminently suitable for activities such as still-hunting fox from ambush on a moonless night, which has hitherto not been possible for this popular hunting form.

The invention will be described in greater detail below with reference to the accompanying drawings in which FIGS. 1 and 2 are respectively a plan view and a cross-sectional view of a planar lens provided with an arrangement according to the invention, incorporating a sighting mark in the form of so-called cross hairs and a plurality of light-producing sources of energy making the sighting mark luminous;

FIGS. 3 and 4 are respectively a plan view and a cross-sectional view of a glass body provided with an arrangement according to the invention, having cross hairs on one of its planar end surfaces and supporting a single light-producing source of energy surrounding said glass body within the area of the plane in which the cross hairs are positioned;

FIGS. 5 and 6 are respectively a plan view and a cross-sectional view of a planar glass lens provided with an arrangement according to the invention which, in this instance, comprises cross hairs and a light-emitting diode as well as a reflector;

Figure 7:
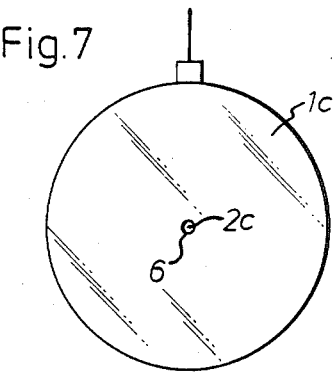
FIGS. 7 and 8 are respectively a plan view and a cross-sectional view of a modification of the arrangement shown in FIGS. 5 and 6.

FIGS. 10 and 11 show a modification of the embodiment according to FIGS. 1 and 2 or FIGS. 3 and 4, FIG. 10 being a section along line X—X in FIG. 11 and FIG. 11 being a section along line XI—XI in FIG. 10;

FIG. 12 is a plan view of a further modification;

FIG. 13 is a cross-sectional view of the embodiment shown in FIG. 12; and

FIG. 14 is a plan view shown partly in section, of still another preferred modification.

FIG. 1 shows a circular lens or disc 1 of glass or like optical material, said disc incorporating a sighting mark having the form of a cross, so-called cross hairs, 2 which may be scored in the disc material, and four light-producing sources of energy 3. The light-producing sources 3 preferably are incorporated in said disc, as shown. Each source 3 may consist of a small glass capsule containing a $\beta$-radiation active substance and constructed to convert the energy of the $\beta$-particles into light. Miniature radiation sources of this type are available on the market, usually under the designation "betalight".

The $\beta$-ray emitting substance may be radioactive tritium gas, and for effective transformation of a substantial part of the energy into light for making the sighting mark luminous, the $\beta$-particles have to be decelerated before arriving at the sighting mark proper. Therefore, the distance through which the energy is transmitted from the emitting source to the sighting mark, such as through the glass disc, is important, as will be explained below.

The glass disc 1 may consist of two thin glued-together glass discs with recesses for the light-producing capsules 3 and with the cross hairs 2 scored into either one of the two abutting surfaces. Alternatively, the capsules 3 may be incorporated in the glass disc by molding.

A reflector 4 in the form of a thin rail of U-shaped cross-section is mounted on the periphery of the glass disc, said reflector reflecting light towards the interior of the glass disc. The glass disc transmits the light, and the walls of the cross hairs shown will then appear in the form of thin luminous lines of essentially the same fineness as the scored lines constituting the cross hairs. The embodiment as disclosed in FIGS. 1 and 2 is thus characterized by one or more very small so-called beta-lights which are disposed within or at least recessed into the glass disc near the periphery thereof and which, by inner reflection from the planar surfaces of the glass disc and from the polished outer edge of said disc, possibly amplified by means of a reflector 4, render the sighting mark, such as aimed cross hairs, luminous.

It should be noted that the sighting marks, such as cross hairs, are shown on an exaggerated scale in FIG. 1 and the following Figures for illustrative purposes only.

In the embodiment according to FIGS. 3 and 4, the light-producing source consists of a tube 3a curved to circular shape and having a small cross-sectional area. The tube encloses a glass disc 1a which may be in the form of a glass body having a greater axial length than the disc 1 in FIGS. 1 and 2. Like the capsules 3 in FIGS. 1 and 2, the tube 3a contains a radioactive substance emitting $\beta$-particles. The tube 3a is surrounded by a reflector 4a which may have semicircular cross-sectional shape and which tightly encloses the tube 3a.

In the embodiment according to FIGS. 5 and 6, the light is generated by a light-emitting diode 3b tightly secured to the peripheral edge of the glass disc 1b, and connected to electric wires 5 and a small battery (not shown). The light transmitted through the glass disc 1b is internally reflected by the planar sides of the disc and the peripheral surface of the disc and will appear as luminous lines in the cross hair scores 2b.

Figure 8:
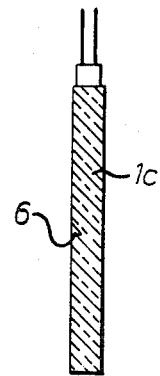

FIGS. 7 and 8 illustrate a variant of the embodiment according to FIGS. 5 and 6, and in this variant the sighting mark is not in the form of cross hairs, but in the form of a small dot 2c which is rendered luminous in the same manner as the cross hairs described above. The dot 2c may consist of a very small cavity in the center of the glass disc 1c, but the dot-shaped sighting mark may also be produced by reflection from a small prism 6 which is formed for example by providing the glass disc on one side with a small recess of triangular or other shape.

Figure 9:
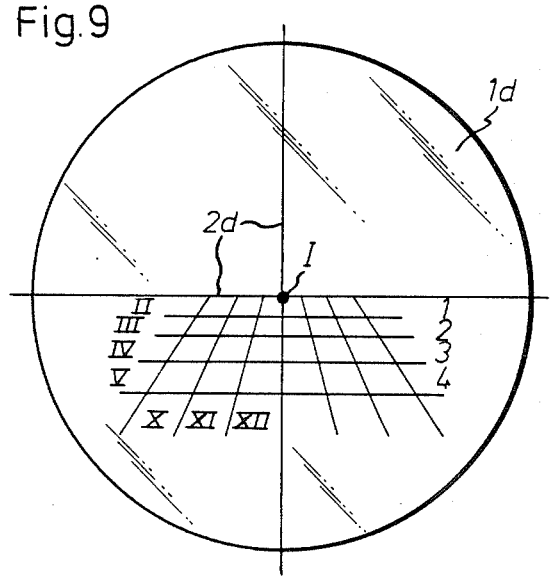
FIG. 9 shows a glass lens having cross hairs and a number of horizontal subsidiary lines for shooting over different target distances, and an arrangement according to the invention for illuminating the horizontal lines.

The glass disc shown in FIG. 9 has a sighting mark in the form of cross hairs 2d which, in the embodiment illustrated, are augmented by a dot-shaped central sighting mark I. The glass disc 1d has, in parallel with the central line of the cross hairs, a number of horizontal lines designated II-V in FIG. 9 and spaced from the horizontal line of the cross hairs and from one another by distances corresponding to different distances to a target, for example the distance 100 meters for the central line of the cross hairs, 150 meters for the line II, 200 meters for the line III, etc. In addition, these horizontal lines are provided with a number of dots on either side of the vertical line of the cross hairs, such as the dots X, XI, XII. These dots may be used as sighting dots if the firearm, upon use of the dot I or the dots lying on the vertical line of the cross hairs, should prove to be aimed incorrectly in the lateral direction.

All of these lines and dots in FIG. 9 can be made luminous by means of a light-producing device of the type mentioned above or described below.

FIGS. 10 and 11 illustrate an arrangement according to the invention in which the glass disc 1e is provided with cross hairs 2e and a channel 3e near the periphery of the disc 1e. The cross hairs 2e and the channel 3e may be formed in one or both sides of two glass discs which are then glued together to form communicating channels. These channels are filled with, for example, radioactive gas, such as tritium gas, rendering the channels luminous.

FIGS. 12 and 13 illustrate a variant of the embodiment according to FIGS. 10 and 11, and in this embodiment the glass disc 1f is surrounded by a circularly curved tubular glass capsule 3f containing radioactive tritium gas or some other suitable light-producing substance.

In the two embodiments as last described, the channels 2e, 3e and the tube 3f, respectively, may be provided with a gas-filling device 7.

The embodiments described above merely serve to illustrate the invention, and many modifications may occur. The sighting mark may be of different shape, such as dot-shaped, cross-shaped, etc. and can be provided in some other manner than by scoring. In order to produce a luminous sighting mark, the light can be received and transformed into visible light, for example on the walls defining scored lines or recesses or, according to FIGS. 10 and 11, by means of gas-filled luminous channels. It should be noted, however, that a sighting mark in the form of cross hairs, for example, can be produced by means of thin wires glued together between two glass discs-for example, in the embodiment according to FIGS. 5 and 6. Thus, light-reflecting wires may have the same function as light-reflecting scored lines.

The thick glass body 1a illustrated in FIG. 4 may be advantageous in that it changes the angles from the light-producing source towards the scored lines of the cross hairs so that these can be illuminated to a greater or lesser extent also in the axial direction in order to be more intensely reflect by the side walls of the scored lines.

The invention also makes it possible to use numbered luminous scales, as in the embodiment shown in FIG. 9, for the lines II, III etc. and for the dots X, XI etc. Use may also be made of an LC technique, in which case a current source may be used for activation.

For embodiments similar to the one shown in FIGS. 12 and 13, use may be made of a glass capsule 3f which on its inner side, or a part thereof, has a fluorescent coating activated by radioactive tritium gas.

FIG. 14 shows a preferred modification wherein the sighting mark is again in the form of so-called cross hairs 2f, but in this modification the cross hairs are freely suspended in the hollow center of an annular support 11 by being fixed at their four outer ends to the support 11 which, in turn, is fixed to the inner side of a tubular member 12 of a telescopic sighting tube 10. An array of beta-lights of the kind described above (for example, four beta-lights as in FIG. 1) are fixed in angularly spaced relationship on the inner side of an annular support 4g designed to serve as a reflector. The annular reflector 4g is fixed to or formed as a part of the tubular member 12, and unlike the reflector 4 shown in FIG. 1, the reflector 4g supports the array of beta-lights 3g, which are coaxial in relation to but axially spaced from the cross hairs support 11 and the sighting mark 2f. In the embodiment shown in FIG. 1, the radial distance from the capsules 3 to the center of the sighting mark 2 is approximately 1r, where r is the radius of the free light-passage through the annular reflector 4. Thus, the light from the capsules must travel a distance which will approximately amount to 1r to reach the center of the sighting mark. Experiments have shown that for most optical materials used in the sighting arrangement (e.g., glass) the energy emitted from a so-called beta-light capsule of the standard type available on the market (and of a volume suitable to be incorporated peripherally in relation to a sighting mark of the cross hairs type in a telescopic sighting tube of normal dimensions for use on a firearm), will be efficiently transformed into visible light on or in the sighting mark to make the mark luminous, provided that the travelling distance through the material amounts to at least the distance 1r mentioned above. In several cases, r is also equivalent to the radius of a normal sighting mark the form of cross hairs of the type shown in, for example, in FIGS. 1 and 14.

In the embodiment shown in FIGS. 3 and 4, the ray path in the optical material 1a is elongated in that scored lines 2a which form the cross hairs, are cut into the glass body or lens 1a at an axial distance from the plane of the lens where the latter is encircled by the tubular member 3a which contains the β-ray producing substance. Thus, the path for transforming energy into visible light from the source of energy to the center of the cross hairs in FIG. 4 is about r/sine 45°, which is about 1.4r. Experiments have shown that if this value is exceeded too far there is a risk that a damping effect, which will counteract the desired energy transforming effect, will dominate when the material in question is glass or some other optical material. In a gas, such as air, the distance from the energy producing source, such as the beta-capsule 3g in FIG. 14, i.e. the ray path, may be somewhat longer. However, the current theory is that the optimal distance lies between about 0 and 2r counted from a plane perpendicular to the axis of the instrument 10 or tube 12 through the center of the sighting mark, e.g. the sighting mark 2f in FIG. 14, and between about 1r and 2r counted from the periphery of the light passage opening through the tube 12, i.e. the supporting ring 11, to said center. As has been mentioned above, r is the normal radius of the light opening in the instrument in the plane wherein the sighting mark is disposed, i.e. in the case of FIG. 14 the opening through the supporting ring 11 and in the case of FIG. 1 the lens 1 encircled by the reflector 4.

As will appear from the above description, the light from the light source is, in the preferred embodiment, substantially or completely transmitted within a body of optical material, usually glass, and is subjected to inner reflection against the sides and edges of the glass body with insignificant radiation loss. In this manner, and because the light intensity and energy can be held at very low levels, the light will interfere with the marksman's eye to an insignificant extent only, and the source of energy will have a long life. However, in another preferred embodiment, shown in FIG. 14, the transmission path may extend through a gas, such as air, and may be slightly longer within the preferred limits mentioned above, to make the sighting mark luminous, and in this latter case it is preferred to use a sighting mark of thin plastic strips or thin metal wires provided with a highly light-reflective surface.

What I claim and desire to secure by Letters Patent is:

1. In a telescopic sighting tube, a luminous sighting arrangement, comprising a reflective sighting mark mounted within said sighting tube and substantially centered on a longitudinal axis of said sighting tube, and at least one light-producing source in the form of a capsule enclosing a β-ray producing substance β-ray to light connecting substance, said capsule being mounted in said sighting tube at a point on a circle centered on said longitudinal axis of said sighting tube, at a radial distance of at least 1r from said longitudinal axis and at an axial distance of between 1r and 2r from a plane perpendicular to said longitudinal axis and passing through the center of said sighting mark, where r is the radius from the center of said sighting mark to the periphery of a light opening in the sighting tube at the level of said plane, with means being provided for directing light from said capsule to said sighting mark, said sighting mark reflecting light produced by said capsule and thereby appearing luminous within said sighting tube.

2. An arrangement as claimed in claim 1, wherein said means for directing radiation comprises a reflector positioned to reflect light from said capsule toward said sighting mark.

3. An arrangement as claimed in claim 1, including a plurality of said capsules mounted in said sighting tube at circumferentially spaced points on said circle.

4. An arrangement as claimed in claim 3, wherein said capsules are mounted on an annular reflector fixed to said sighting tube and oriented to reflect light produced by said capsules to said sighting mark.

5. An arrangement as claimed in claim 4, wherein said annual reflector is formed as part of a tubular member of said sighting tube, in which tubular member said sighting mark is also mounted.

* * * * *